United States Patent
Rauner

(10) Patent No.: US 11,575,273 B2
(45) Date of Patent: Feb. 7, 2023

(54) METHOD CARRIED OUT BEFORE CHARGING A VEHICLE BATTERY TO INFLUENCE A CHARGING PROCESS TO CONFORM THE CHARGING PROCESS WITH A USER PREFERENCE INPUTTED BEFORE COMMENCING THE CHARGING PROCESS AND APPARATUS FOR PERFORMING THE METHOD

(71) Applicant: Dr. Ing. h.c. F. Porsche Aktiengesellschaft, Stuttgart (DE)

(72) Inventor: Thomas Rauner, Blaustein (DE)

(73) Assignee: Dr, Ing. h. c. F. Porsche AG, Stuttgart (DE)

( * ) Notice: Subject to any disclaimer, the term of this patent is extended or adjusted under 35 U.S.C. 154(b) by 93 days.

(21) Appl. No.: 16/920,960

(22) Filed: Jul. 6, 2020

(65) Prior Publication Data
US 2021/0001743 A1 Jan. 7, 2021

(30) Foreign Application Priority Data
Jul. 3, 2019 (DE) ...................... 10 2019 117 944.0

(51) Int. Cl.
- H02J 7/00 (2006.01)
- H01M 10/44 (2006.01)
- B60L 53/62 (2019.01)
- B60L 58/24 (2019.01)
- B60L 53/20 (2019.01)
- B60L 53/66 (2019.01)

(52) U.S. Cl.
CPC ........ *H02J 7/007192* (2020.01); *B60L 53/20* (2019.02); *B60L 53/62* (2019.02); *B60L 58/24* (2019.02); *H01M 10/443* (2013.01); *H02J 7/00711* (2020.01); *B60L 53/66* (2019.02)

(58) Field of Classification Search
CPC ...... B60L 58/24; B60L 53/20; H01M 10/443; H02J 7/00711; H02J 7/007192
USPC .......................................... 320/129, 139, 150
See application file for complete search history.

(56) References Cited

U.S. PATENT DOCUMENTS

| 6,229,285 B1 * | 5/2001 | Ding | H02J 7/00047 320/132 |
|---|---|---|---|
| 2002/0070710 A1 * | 6/2002 | Yagi | H02J 7/0091 320/150 |
| 2014/0277869 A1 | 9/2014 | King et al. | |

(Continued)

FOREIGN PATENT DOCUMENTS

| DE | 10 2012 205 095 | 10/2013 |
|---|---|---|
| DE | 10 2014 204 260 | 9/2014 |

(Continued)

*Primary Examiner* — Richard Isla
*Assistant Examiner* — Manuel Hernandez
(74) *Attorney, Agent, or Firm* — Gerald E. Hespos; Michael J. Porco

(57) ABSTRACT

A method and apparatus (100) are provided for charging a vehicle battery (108). The apparatus (100) includes a controller (102) designed to influence a charging process of the vehicle battery (108). The apparatus (100) further has a switching device (104) to transmit a signal to the controller (102) in response to operation of the switching device (104) by a user. The controller (102) is designed to influence the vehicle battery (108) before the charging process in response to receiving the signal depending on at least one desired state for the charging process.

8 Claims, 2 Drawing Sheets

(56) References Cited

U.S. PATENT DOCUMENTS

| | | | | |
|---|---|---|---|---|
| 2015/0077054 A1* | 3/2015 | Uyeki | ................... | G06Q 50/06 |
| | | | | 320/109 |
| 2015/0077057 A1* | 3/2015 | Kelty | ............... | H02J 7/007194 |
| | | | | 320/109 |
| 2016/0214495 A1* | 7/2016 | Murata | ................... | B60L 58/26 |
| 2018/0297481 A1* | 10/2018 | Augst | .................... | H02J 7/045 |
| 2021/0336299 A1* | 10/2021 | Matthey | ............... | H02J 7/0048 |

FOREIGN PATENT DOCUMENTS

| | | | | |
|---|---|---|---|---|
| WO | WO-2009147505 A2 * | 12/2009 | .............. | B60L 58/13 |
| WO | WO-2011122946 A2 * | 10/2011 | ............... | B60L 1/08 |

* cited by examiner

METHOD CARRIED OUT BEFORE CHARGING A VEHICLE BATTERY TO INFLUENCE A CHARGING PROCESS TO CONFORM THE CHARGING PROCESS WITH A USER PREFERENCE INPUTTED BEFORE COMMENCING THE CHARGING PROCESS AND APPARATUS FOR PERFORMING THE METHOD

CROSS REFERENCE TO RELATED APPLICATION

This application claims priority under 35 USC 119 to German Patent Appl. No. 10 2019 117 944.0 filed on Jul. 3, 2019, the entire disclosure of which is incorporated herein by reference.

BACKGROUND

Field of the Invention

The invention relates to a method and to an apparatus for charging a battery, in particular of an electric vehicle.

Related Art

DE 10 2014 204 260 A1 and DE 10 2012 205 095 A1 disclose aspects for charging batteries of an electric vehicle.

It is desirable to further improve the charging of batteries in vehicles.

SUMMARY

An apparatus for charging a vehicle battery comprises a controller that is designed to influence a charging process of the vehicle battery. More particularly, the apparatus comprises a switching device that is designed to transmit a signal to the controller in response to operation of the switching device by a user. The controller is designed to influence the vehicle battery before the charging process in response to receiving the signal depending on at least one desired state for the charging process.

Battery electric vehicles and plug-in hybrid vehicles have batteries, and the power consumption of the vehicles is limited by various boundary conditions. As a result, a user experiences lower charging speeds than expected in some situations. For example, a range of approximately 300 km ideally can be recharged in 15 minutes by 800 V technology when all boundary conditions, primarily with respect to the battery temperature, are satisfied. If this is not the case, a longer charging phase may be required. In the invention, the user is able to express a battery recharging wish. The best preconditions for charging then are created before the charging process. This shortens the charging period or brings it in line with the expectation of the user.

The switching device may be a tactile user interface that can be in a vehicle. The switching device may be a pushbutton. This allows particularly simple operator-control implementation in a vehicle by a charging performance pushbutton.

The controller may determine and/or prespecify a boundary condition, in particular a desired temperature, for the charging process as a desired state. This allows a function to be activated in the background, for example, in software of a battery management system and a pulse inverter. The function establishes the ideal state of the system and establishes the optimum boundary conditions for recharging.

The controller may influence a temperature of the vehicle battery before the charging process by battery pulsing depending on the desired state. Battery pulsing, causes energy drawn from the battery to be returned again to heat up the battery.

The controller may determine and/or outputs feedback, in particular an anticipated charging time for a human/machine interface. As soon as the user operates the pushbutton, they are shown, for example, how much time is required to recharge a specific quantity of energy in kW and/or range in km.

The controller may determine and/or output a quantity of energy that can be recharged in the charging time and/or a range that can be achieved with the quantity of energy. Therefore, it is possible to continuously display how a recharging time is reduced when this pushbutton is activated.

A method for charging a vehicle battery provides for a signal to be received at a controller from a switching device. The signal is transmitted in response to operation of the switching device by a user. The vehicle battery is influenced before the charging process in response to receiving the signal depending on at least one desired state for the charging process.

The switching device may be a tactile user interface that can be arranged in a vehicle, in particular as a pushbutton. This is effective activation of the preparation.

A boundary condition for the charging process, such as a desired temperature, may be determined and/or prespecified as a desired state.

A temperature of the vehicle battery may be influenced before the charging process by battery pulsing depending on the desired state. The temperature has a particularly sizable impact on the efficiency of the following charging process.

Feedback, such as an anticipated charging time for a human/machine interface, may be determined and/or output. This brings the expectations of the user in line with a currently technical possible or expedient charging time.

A quantity of energy that can be recharged in the charging time and/or a range that can be achieved with the quantity of energy may be determined and/or output. In this way, the user is provided with detailed information.

Further advantageous embodiments can be gathered from the following description and the drawing.

DETAILED DESCRIPTION

Figure 1:
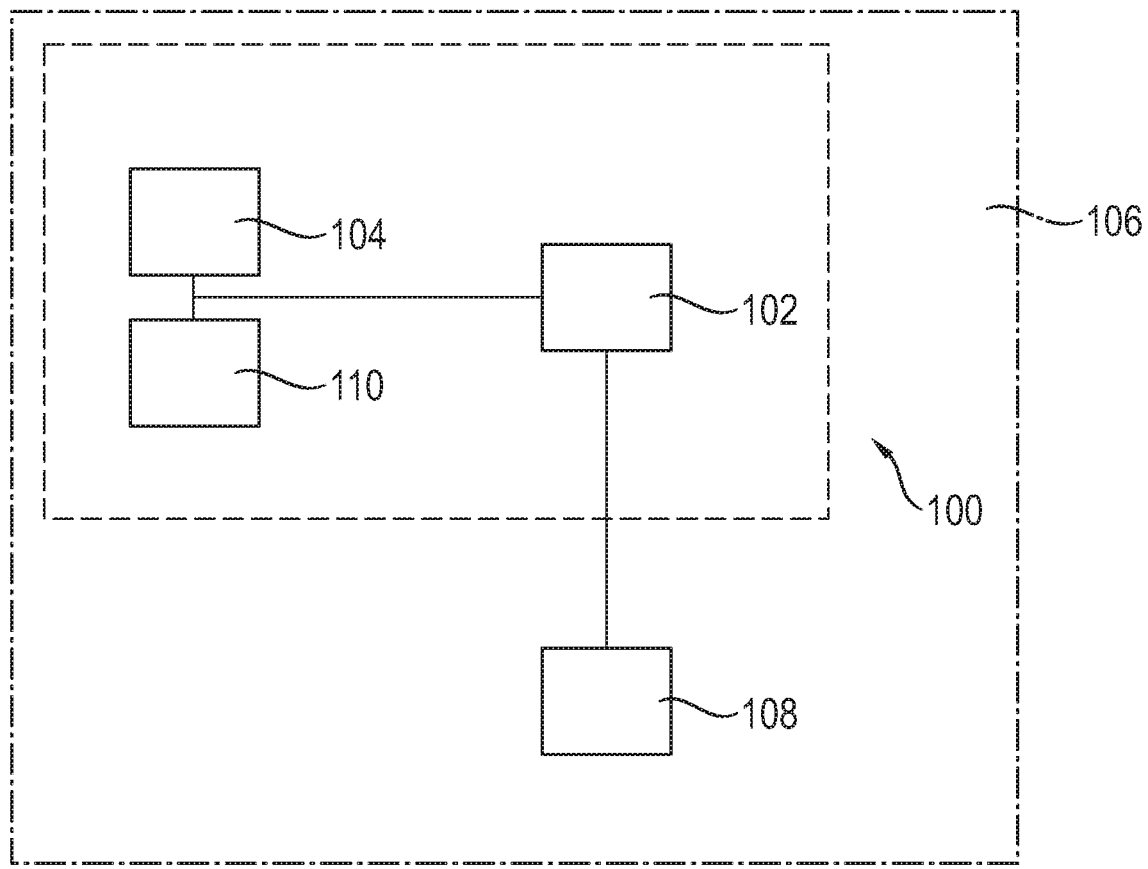
FIG. 1 shows a schematic illustration of parts of a vehicle.
Figure 2:
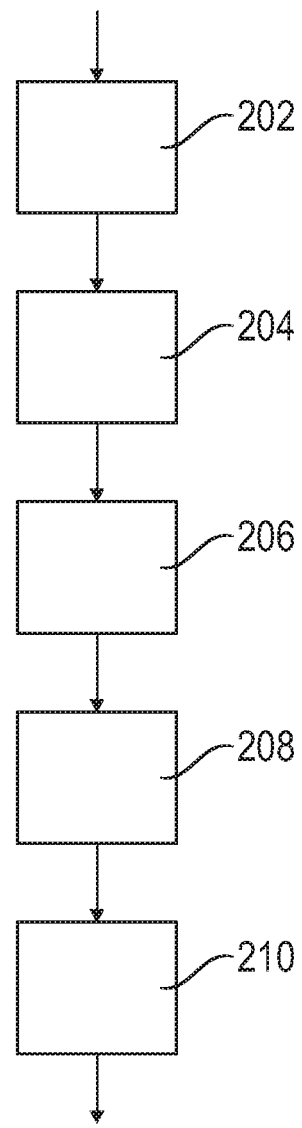
FIG. 2 shows steps in a method for charging a vehicle battery.

FIG. 1 schematically illustrates an apparatus 100 that comprises a controller 102 and a switching device 104 arranged in a vehicle 106. The controller 102 and the switching device are connected by a signal conductor in the example. A wireless interface can also be provided. The controller 102 comprises, for example, a microcontroller with a signal input and a signal output.

The switching device 104 is, for example, a tactile user interface. In the example, the switching device is a pushbutton. The switching device 104 is arranged in the vehicle 106, in particular in a dashboard or in the cockpit. An audio interface for voice-controlled switching can also be provided.

The switching device 104 is designed to transmit a signal to the controller 102 in response to operation of the switching device 104 by a user. In the case of an analog pushbutton, the signal can be an analog electrical signal. A digital signal, in particular a bus message in accordance with automotive ethernet or CAN protocol, can also be provided. The signal conductor and the signal input are designed in line with the transmission process used.

The apparatus 100 is designed for charging a vehicle battery 108 in accordance with the method described below. The controller 102 is designed to influence a charging process of the vehicle battery 108. The controller 102 is designed to influence the vehicle battery 108 before the charging process in response to receiving the signal depending on at least one desired state for the charging process.

The controller 102 determines a boundary condition, in particular a desired temperature, for the charging process as a desired state. In the example, the controller 102 prespecifies the desired state at the signal output of the microcontroller.

The controller 102 influences a temperature of the vehicle battery before the charging process by battery pulsing depending on the desired state. For example, a function of a battery management system is used to activate a pulse inverter in such a way that energy is drawn from the battery and returned again by battery pulsing to heat up the battery, for example until the desired temperature is reached.

The controller 102 can determine feedback an anticipated charging time for a human/machine interface 110. The controller 102 also can determine a quantity of energy in kW that can be recharged in the charging time and/or a range in km which can be achieved with the quantity of energy. The controller 102 can output the feedback, the charging time, the rechargeable quantity of energy and/or the range that can be achieved with the quantity of energy at the signal output of the microcontroller.

The method makes provision, in a step 202, for the signal to be transmitted in response to operation of the switching device 104 by a user.

In a step 204, the signal is received from the switching device 104 in the controller 102.

In a step 206, the desired state, for example the boundary condition, is determined. In the example, the desired temperature for the charging process is determined and prespecified.

In a step 208, the vehicle battery 108 is influenced before the charging process in response to receiving the signal depending on at least one desired state for the charging process. Provision can be made to check, in response to receiving the signal at the controller 102, whether a charging process is taking place. In this case, the signal is ignored when a charging process is taking place and the vehicle battery 108 is influenced before the charging process depending on the desired state when no charging process is taking place.

The temperature of the vehicle battery 108 can be influenced before the charging process by battery pulsing depending on the desired state.

In step 210, provision optionally is made to determine and to output feedback, in particular the anticipated charging time for a human/machine interface 110. Provision can be made to determine and to output the quantity of energy which can be recharged in the charging time and/or the range that can be achieved with the quantity of energy.

The method then ends. Optionally, the step 202 or 210 is executed for as long as the pushbutton is pushed for renewed display of the updated anticipated charging time. The method then is ended when the pushbutton no longer is pushed.

The charging process itself can be started independently thereof and provision can be made for this start to likewise lead to ending of the method.

The apparatus 100 can be designed so that an anticipated recharging time is determined repeatedly and output before the charging process in response to operation of the switching device 104 by the controller 102, in particular until a stop signal is identified. The stop signal can be triggered, for example, by renewed operation of the switching device 104. In one example, the apparatus 100 is designed to update the recharging time for as long as the pushbutton is activated.

The apparatus 100 can be designed so that the controller 102 determines and/or outputs a selection signal for a charging post type in response to operation of the switching device 104. In the example, the selection signal is output by the signal output via the human/machine interface 110 and prompts the user to select, in particular, an 800V, 220V, or 3.6 kW charging post. In this case, the human/machine interface 110 in the example is designed to detect an input of the user for selecting the charging post to be used, and to correspondingly set the battery management system. In the example, the desired state or the boundary condition, in particular the desired temperature, is prespecified depending on the selected charging post.

What is claimed is:

1. An apparatus for influencing charging of a vehicle battery for conforming the charging of the vehicle battery to at least one user preference, the apparatus comprising:
    a switching device that is designed to be operable by a user for receiving from the user at least one input indicative of the at least one user preference and to transmit a signal indicative of the user preference; and
    a controller communicating with the switching device and with the vehicle battery, the controller being configured: to determine whether a charging of the vehicle battery is being carried out, to ignore the at least one input indicative of the at least one user preference if the charging of the vehicle battery is being carried out; and to determine at least one boundary condition consistent with the at least one user preference for recharging the vehicle battery in response to the signal transmitted based on the operation of the switching device by the user only if the charging of the vehicle battery is not already being carried out, the controller further being configured to cause the vehicle battery to carry out a battery pulsing operation before the charging of the vehicle battery, the battery pulsing operation causing energy to be drawn from the vehicle battery and returned to the vehicle battery for heating the vehicle battery to a temperature consistent with the at least one user preference, the controller also being configured to output to the user an anticipated charging time based on the user input and at least one of a quantity of energy that can be recharged in the anticipated charging time and a range that can be achieved with the quantity of energy.

2. The apparatus of claim 1, wherein the switching device is a tactile user interface arranged in a vehicle as a pushbutton.

3. The apparatus of claim 1, wherein the controller is designed to determine and/or prespecify the at least one boundary condition for the charging of the vehicle battery as a desired state.

4. A method for influencing a charging of a vehicle battery, comprising:
  operating a user-operable switching device for producing a signal indicative of at least one user preference;
  transmitting the signal indicative of the at least one user preference from the switching device to a controller;
  operating the controller: to determine whether the charging of the vehicle battery is being carried out, to ignore the signal indicative of the at least one user preference if the charging of the vehicle battery is being carried out, and to determine at least one boundary condition for recharging the vehicle battery in a manner consistent with the at least one user preference only if the charging of the vehicle battery is not already being carried out, the at least one boundary condition including a battery temperature for achieving the charging of the vehicle battery in a manner consistent with the at least one user preference;
  using the controller to cause the vehicle battery to attain the at least one boundary condition, including initiating a battery pulsing operation before the charging of the vehicle battery, the battery pulsing operation causing energy to be drawn from the vehicle battery and returned to the vehicle battery for heating the vehicle battery to a temperature for achieving the charging of the vehicle battery consistent with the at least one user preference; and
  using the controller to determine an anticipated charging time based on the signal indicative of the at least one user preference and then outputting to a human/machine interface the anticipated charging time and at least one of a quantity of energy that can be recharged in the anticipated charging time and/or a range that can be achieved based on the anticipated charging time.

5. The method of claim 4, wherein operating the user-operable switching device comprises operating a tactile user interface arranged in a vehicle as a pushbutton.

6. The method of claim 4, further comprising repeatedly using the switching device for inputting at least one alternate user preference in response to the determined quantity of energy and/or the driving range output to the user based on the user preference previously input at the switching device, and repeatedly determining the quantity of energy and/or the driving range for each successive input of an alternate user preference at the switching device.

7. The method of claim 6, further comprising using the switching device to generate a stop signal for selecting a particular one of the alternate user preferences based on the quantity of energy and/or the driving ranges output to the user.

8. The method of claim 7, further comprising initiating the charging of the vehicle battery after the at least one boundary condition of the vehicle battery has been achieved.

* * * * *